US008196178B2

(12) United States Patent
Lambert et al.

(10) Patent No.: US 8,196,178 B2
(45) Date of Patent: Jun. 5, 2012

(54) EXPERT SYSTEM ANALYSIS AND GRAPHICAL DISPLAY OF PRIVILEGE ELEVATION PATHWAYS IN A COMPUTING ENVIRONMENT

(75) Inventors: John Lambert, Seattle, WA (US); Matthew Thomlinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/244,023

(22) Filed: Oct. 5, 2005

(65) Prior Publication Data

US 2007/0079358 A1 Apr. 5, 2007

(51) Int. Cl.
*G06F 21/00* (2006.01)

(52) U.S. Cl. .................. 726/2; 713/182; 726/25

(58) Field of Classification Search .......... 707/1; 726/2, 726/25; 713/182
See application file for complete search history.

(56) References Cited

U.S. PATENT DOCUMENTS

| 5,278,901 | A | 1/1994 | Shieh et al. ................ 380/4 |
| 6,647,400 | B1 | 11/2003 | Moran ......................... 707/205 |
| 6,718,386 | B1 | 4/2004 | Hanfland |
| 7,013,395 | B1* | 3/2006 | Swiler et al. ................ 726/25 |
| 7,117,273 | B1 | 10/2006 | O'Toole et al. |
| 7,299,383 | B2 | 11/2007 | David et al. |
| 2002/0078378 | A1 | 6/2002 | Burnett ........................ 713/201 |
| 2002/0083343 | A1 | 6/2002 | Crosbie et al. ............... 713/201 |
| 2002/0174087 | A1* | 11/2002 | Hao et al. ..................... 707/1 |
| 2003/0033516 | A1 | 2/2003 | Howard et al. |
| 2004/0255277 | A1 | 12/2004 | Berg et al. |
| 2005/0010806 | A1* | 1/2005 | Berg et al. ..................... 713/200 |
| 2005/0193430 | A1* | 9/2005 | Cohen et al. .................. 726/25 |
| 2006/0010153 | A1* | 1/2006 | Bugaj .......................... 707/102 |
| 2006/0085858 | A1* | 4/2006 | Noel et al. ..................... 726/25 |
| 2007/0061125 | A1 | 3/2007 | Bhatt et al. |
| 2007/0079372 | A1 | 4/2007 | Lambert et al. |
| 2007/0083912 | A1 | 4/2007 | Lambert et al. |

FOREIGN PATENT DOCUMENTS

WO WO 02/39277 5/2002

OTHER PUBLICATIONS

Treaster et al. "Detection of privilege escalation for Linux cluster security." Published Mar. 4, 2005 to ZDNet by the University of Illinois.*

Ortalo et al. "Experimenting with Quantitative Evaluation Tools for Monitoring Operational Security." LAAS Report 96369. Jan. 1997. 22 pages.*

(Continued)

*Primary Examiner* — Brandon Hoffman
(74) *Attorney, Agent, or Firm* — Woodcock Washburn LLP (57) ABSTRACT

A data collection application is executed on a target system. Various data indicative of privilege elevation pathways is collected, including user account data, file permission data, and system registry data. The collected data is analyzed according to heuristics. System accounts are displayed on a graph as nodes. Detected privilege elevations between the accounts are displayed as edges between their corresponding accounts. A user may customize the displayed graph to focus on particular goal accounts, and categories of privilege elevations.

18 Claims, 8 Drawing Sheets

OTHER PUBLICATIONS

Dacier et al. "Quantitative Assessment of Operation Security: Models and Tools." May 1996. 22 pages.*

Dacier et al., "Privilege Graph: An Extension to the Typed Access Matrix Model", Lecture Notes in Computer Science, 1994, 875, 319-334.

Noel et al. "Managing Attack Graph Complexity Through Visual Hierarchical Aggregation", Proceedings of the 2004 ACM workshop on Visualization and data mining for computer security, Fairfax, Virginia, USA, Oct. 29, 2004, 10 pages.

PCT Application No. PCT/US2006/038456: International Search Report and Written Opinion of the International Searching Authority, Feb. 16, 2007, 10 pages.

Young et al., "The Hacker's Handbook: The Strategy Behind Breaking into and Defending Networks", 2004, Chapter 16, 123 pages.

* cited by examiner

FIG 1

Elevations for Authenticated Users

| Target Account | Path |
|---|---|
| 1. <u>Matt</u> | Elevation from Authenticated Users to Matt through foo.exe (PID 776) process or thread ACL (New) |
| 2. <u>Matt</u> | Elevation from Authenticated Users to Matt through foo.exe (Thread 780)(PID 776) process or thread ACL (New) |

FIG 2a

Elevation Path #1

| Path | Path |
|---|---|
| 1. <u>Authenticated Users</u> | Start elevation search as Authenticated Users (new)(new) |
| 2. <u>Matt</u> | Elevation from Authenticated Users to Matt through foo.exe (PID 776) process or thread ACL (new)(new) |
| 3. <u>Administrators</u> | Elevation from Matt to Administrators through group membership (new)(new) |
| 4. <u>Local System</u> | Elevation to System through privileged group membership in Administrators |

EXPERT SYSTEM ANALYSIS AND GRAPHICAL DISPLAY OF PRIVILEGE ELEVATION PATHWAYS IN A COMPUTING ENVIRONMENT

CROSS REFERENCE TO RELATED APPLICATIONS

This application is related to co-pending application Ser. No. 11/244,017 filed Oct. 5, 2005, and application Ser. No. 11/243,922 filed Oct. 5, 2005. The contents of both applications are hereby incorporated by reference.

BACKGROUND

Computers and computer networks are complex systems. The security environment is constantly changing as new software programs are installed, each introducing new variables and relationships into the system. These systems have a degree of sharing, interdependency, and interactivity, which makes the entire computer or network vulnerable to flaws introduced at any part of the system.

A particular risk in computer systems is associated with privilege elevation. Any time the concept of identity is represented on a system there is the possibility of accidental crossing of those identities. Processes executing on a computer each have an associated identity and privilege. Similarly, access to files and resources may also have been granted to only certain identities or privileges. Privileges are used to specify the available files or resources for a particular process or user account.

Problems can arise where entities interact with other entities of different privileges. These problems are known as privilege elevation flaws. In one such example, a first account may have write access to a file that a second account executes or has read access to. This may potentially allow the first account to execute code as the second account because the first account can alter or change the executable that the second account runs. Multiple privilege hops or elevations can be joined into elevation chains. By following a privilege elevation path or chain, a hacker or malicious user can potentially gain complete access to a computer system's resources and accounts, and possibly access to other computers on the network.

While the problems associated with privilege elevation flaws are known, they are notoriously difficult to locate or diagnose. Modem operating systems provide a variety of privilege and access control functionality, but they offer no feedback regarding how effectively those privilege and access control functionalities are being used. Because computer processes interact with each other and the computer operating system in a variety of ways, potential new privilege flaws can be introduced into a system with every new software installation or account creation.

SUMMARY

A data collection application is executed on a target system. Various data indicative of privilege elevation pathways is collected, including user account data, file permission data, and system registry data. The collected data is analyzed according to heuristics. System accounts are displayed on a graph as nodes. Detected privilege elevations between the accounts are displayed as edges between their corresponding accounts. A user may customize the displayed graph to focus on particular goal accounts, and categories of privilege elevations.

DETAILED DESCRIPTION

Figure 1:
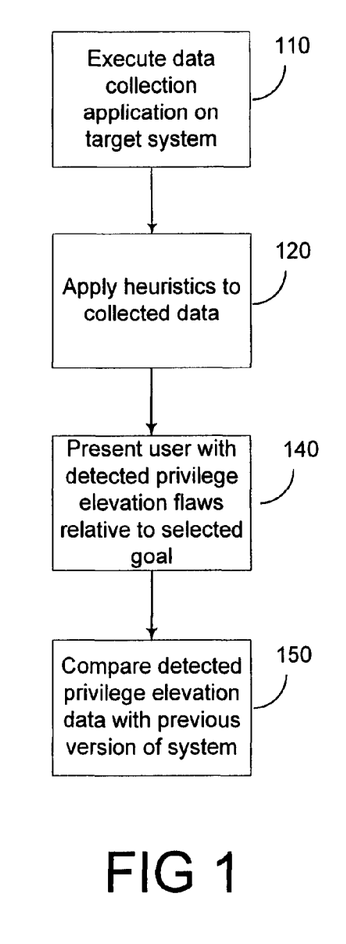
FIG. 1 is a flow diagram illustrating an exemplary method for privilege elevation detection in accordance with the invention.

FIG. 1 is a diagram illustrating an exemplary method for privilege elevation analysis. A data collection program is executed. The data collection program collects permission information from various resources of a computer including network resources. The collected data is analyzed using a variety of heuristics designed to detect privilege elevation flaws in the computer system. Certain goal accounts are defined by a user or administrator and those goals are solved for. The user is then presented with a report detailing the various accounts that are able to reach the goal accounts using detected privilege elevations. The user may then revise the goal accounts, or request further detail about particular privilege elevations flaws. In addition, the detected privilege elevation flaws may be compared with detected privilege elevation flaws from previous executions of the data collection program to determine if improvements have been made to the system, or to view new vulnerabilities introduced by a recent software install, for example.

At 110, a data collection program is executed on the system being analyzed. The data collection program desirably collects permission data from a variety of resources on the system. This may include, but is not limited to registry data, file system permission data, services permissions, COM and DCOM objects, any executing programs with known security flaws, group permissions, user account privileges and rights, and kernel object access permissions. The collected data may also be collected from network resources such as active directory and file servers, for example. The data collection program may be executed locally on the particular system being tested, or may be executed remotely from another computer on a network, for example. However, the data collection program is desirably given full access permissions on the host system. Providing the data collection program the highest access rights ensures that the program can collect the desired permission data from the system. Any system, method or technique known in the art for data collection may be used.

The data collection program may store the collected data in a database, file or collection of files, or any other storage device known in the art, for example.

At 120, heuristics may be applied to the collected data to detect privilege elevation flaws. A privilege elevation flaw allows a user account to potentially gain the privileges of another user account. For example, if a first user account is able to write to an executable that a second user account executes, then the first user account could potentially alter the executable, effectively providing the ability to execute code as the second user account. The heuristics are desirably used to identify situations where a privilege elevation may occur by looking for patterns that may identify a privilege elevation. Over time the heuristics used may be changed to reflect new information regarding privilege elevations. A privilege elevation flaw may exist between accounts, between groups and accounts, or between groups. More generally, privilege elevations may exist between any two security identifiers including transient security identifiers, for example. Any system, method or technique known in the art for detecting privilege elevation flaws may be incorporated into the heuristics. These heuristics may include, but are not limited to, the heuristics described below:

User Group Membership

A user may not be assigned access to a resource, but he or she may be part of a group that is assigned access. Therefore, membership in a group may be considered an elevation for users in the group. For example, a user who has membership in Power Users can act as a Power User.

Administrators

Generally, administrators are given the highest privileges in a system. Therefore, privilege elevations to an administrator account may be treated as an elevation to the Local System, since Administrators can be considered Local System.

A process Running as a User may Become Groups of that User

A process that is running as a particular user account may become that user. Because users may act as groups that the user account is a member of, there may be a privilege elevation between the process and groups that the user account is a member of. This may be represented by a process access token, for example.

Shared Start-up Directory Privileges

Accounts that have access to the shared start up directory may be able to become accounts that execute programs found or referenced in the shared start-up directory. Therefore, there may be a privilege elevation between an account with access to the start-up directory, and accounts that execute programs found in the start-up directory.

User Logins

Users logged into a particular system may potentially be impersonated by the system that the users are logged into. Therefore, it may be desirable to consider users logged into a system as possible privilege elevations from the system to those users.

Past File Executions

A first user that has write permissions on an executable that was executed by a second user could potentially indicate a privilege elevation between the first user and the second user account. The list of previously executed files for any account may be found in the system audit log, for example.

Executables owned by administrator or system

Executables that are owned by an Administrator or the System account that are writable by a user account may be a potential privilege elevation between the user who has write access and the Administrator or System account.

Processes that Load Modules

If a process has loaded a module in a directory that is writable, or in a directory path where any previous directory is writable, then there may be a privilege elevation from the accounts that have write access to the directory and the account that owns the process.

At 140, the detected privilege elevation flaws identified by the described heuristics may be presented to a user or administrator as part of a computer generated report. The detected privilege elevation flaws may be presented to the user as privilege elevation paths, for example. A privilege elevation path is a chain of privilege elevation flaws from one security identifier, such as an account or group, to another. The privilege elevation path illustrates the ways a hacker or intruder could gain the permissions of a high level system account using privilege elevation flaws.

The detected privilege elevation pathways may be presented relative to a selected goal or target account. For example, the user may be interested in low privileged user accounts, that through a particular privilege elevation pathway, could be used to reach a user account with administrative rights. Because the accounts could potentially gain the privileges of the administrative account, it may be desirable to focus the report to these types of privilege elevation pathways.

In another example, the user may be interested in user accounts that can reach a particular user account with unique access rights, like the user account of the president of a company, for example. Identifying the accounts that could access this particular account may help the user better protect the account. Any system, method, or technique known in the art for identifying a privilege elevation pathway relative to a goal account may be used.

Figure 2A:
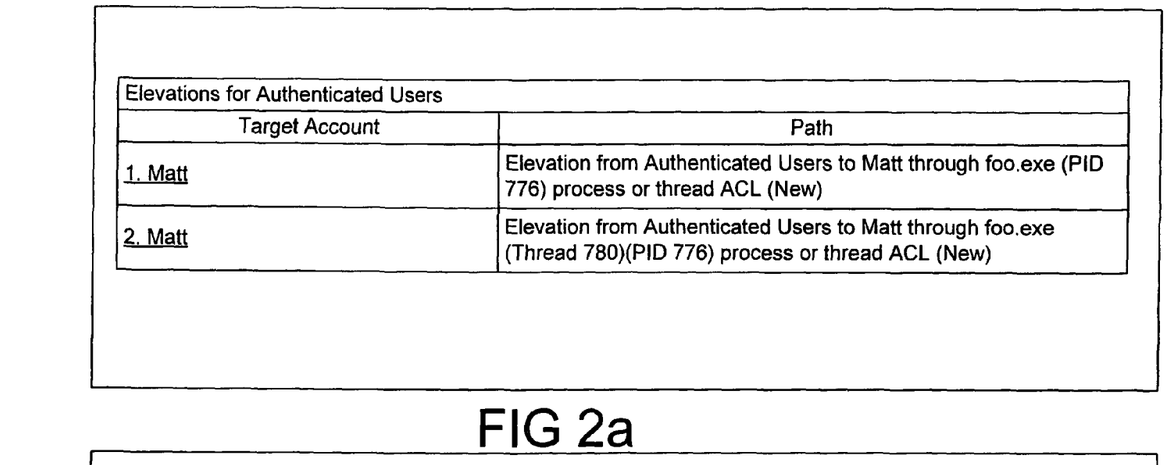
FIG. 2a is a screenshot illustrating privilege elevation pathways detected by an exemplary privilege elevation detection system in accordance with the invention.

As shown in the exemplary screenshot at FIG. 2a the user may be presented with a report relative to selected goal accounts. In this case the user may have selected to view the accounts that through privilege elevations, could reach the Matt account. Accordingly, the user is presented with two detected privilege elevation pathways from authenticated users to Matt through a process called foo.exe.

Figure 2B:
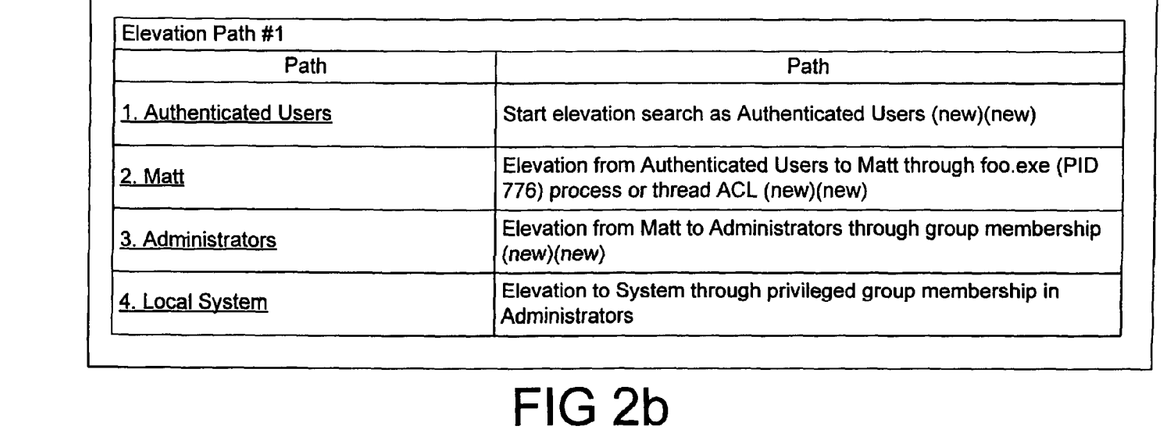
FIG. 2b is a screenshot illustrating privilege elevation pathways detected by an exemplary privilege elevation detection system in accordance with the invention.

As described above, the user may wish to change the particular start or goal accounts used to view the detected privilege elevation flaws. As shown in FIG. 2b, the user may have selected to view a particular privilege elevation path from the authenticated user accounts to the Local System account. In general, the Local System account may be a desirable goal account because it represents the highest level of privilege, and if a user can get the privileges of that account, they can control the entire system.

At 150, the detected privilege elevation pathways may be compared between different system states. As described above, the data collection program may be executed on a particular computer system. The particular features present on the system, including accounts, installed applications, etc., may be described as a state of the system. By comparing successive states of a system, the overall improvements or detriments created by the installation of a particular application can be measured.

For example, an administrator may wish to determine if the addition of a new email application introduces any additional privilege elevation flaws into the system. The administrator may execute the privilege elevation pathway detection program on a system state prior to installing the email application, then the administrator may execute the privilege elevation detection program on a system state after the installation of the application. The program may then display any new privilege elevation flaws introduced into the system, or alternatively, the program may display those flaws that create a path from a low privilege account to a high privilege account such as Local System, for example. Any system, method, or technique known in the art for comparing the detected privilege elevation flaws between systems may be used.

Figure 3:
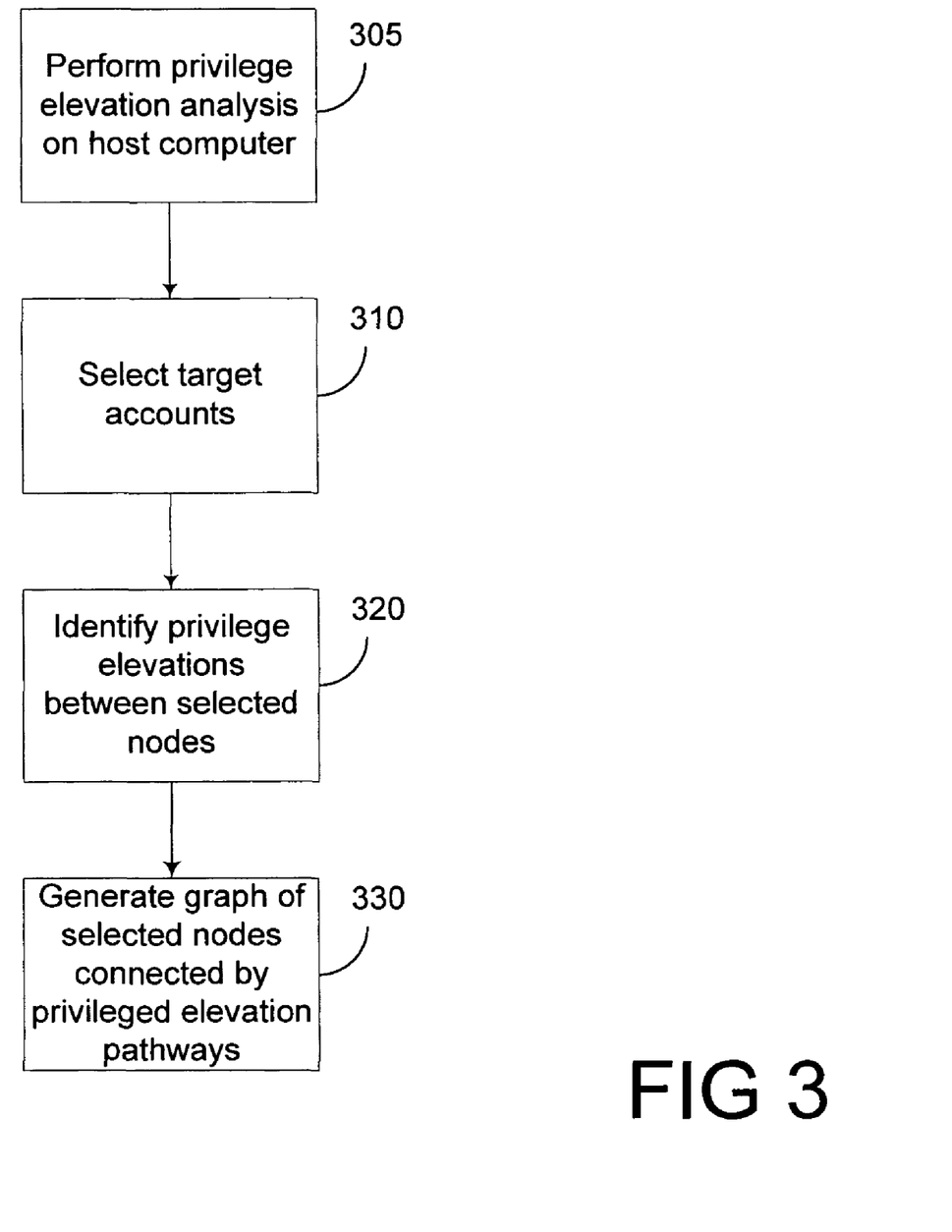
FIG. 3 is a flow diagram illustrating an exemplary method for privilege elevation graph generation in accordance with the invention.

FIG. 3 is a diagram illustrating an exemplary method for generating a graphical representation of privilege elevation flaws in a computer system. A privilege elevation analysis is performed on a host system. Selected user accounts are illustrated on a graph as nodes. Detected privilege elevation pathways between the selected nodes are illustrated on the graph as edges between the nodes. The user may then interact with the generated graph to increase the level of detail provided, and add or change specific goal nodes.

At 305, a privilege elevation analysis is desirably performed on a host computer. The privilege elevation analysis may be conducted using the method as described with respect to FIG. 1, for example.

At 310, a user may select desired accounts to view on the privilege elevation graph. As described above, privilege elevation flaws may allow a malicious user to move from one account to another by exploiting the privilege elevations. These accounts, or security identifiers, can be represented as nodes on a connected graph. The particular privilege elevation flaw that allows the user to move between any two nodes can be represented as an edge between the nodes on the graph.

Because there may be many security identifiers in a particular system, it may be desirable for a user to first select the relevant security identifiers to view on the graph. For example, a user may wish to see accounts or security identifiers that through privilege elevation flaws can reach Local System. Accordingly, the user may specify that nodes associated with accounts that can reach Local System be displayed. In another example, the user may wish to see low privileged accounts that are able to move to higher privileged accounts, regardless of whether they can reach Local System. Accordingly, nodes associated with these accounts may be displayed. Any system, method, or technique known in the art for selecting the security identifiers to view may be used.

At 320, nodes corresponding to the relevant or selected security identifiers may be displayed on a graph and connected using the detected privilege elevation flaws from 305. As described in FIG. 1, a plurality of privilege elevation flaws may have been detected by applying the heuristics to data collected from the host system. These detected privilege elevation flaws may be represented as edges between the selected nodes.

Figure 4:
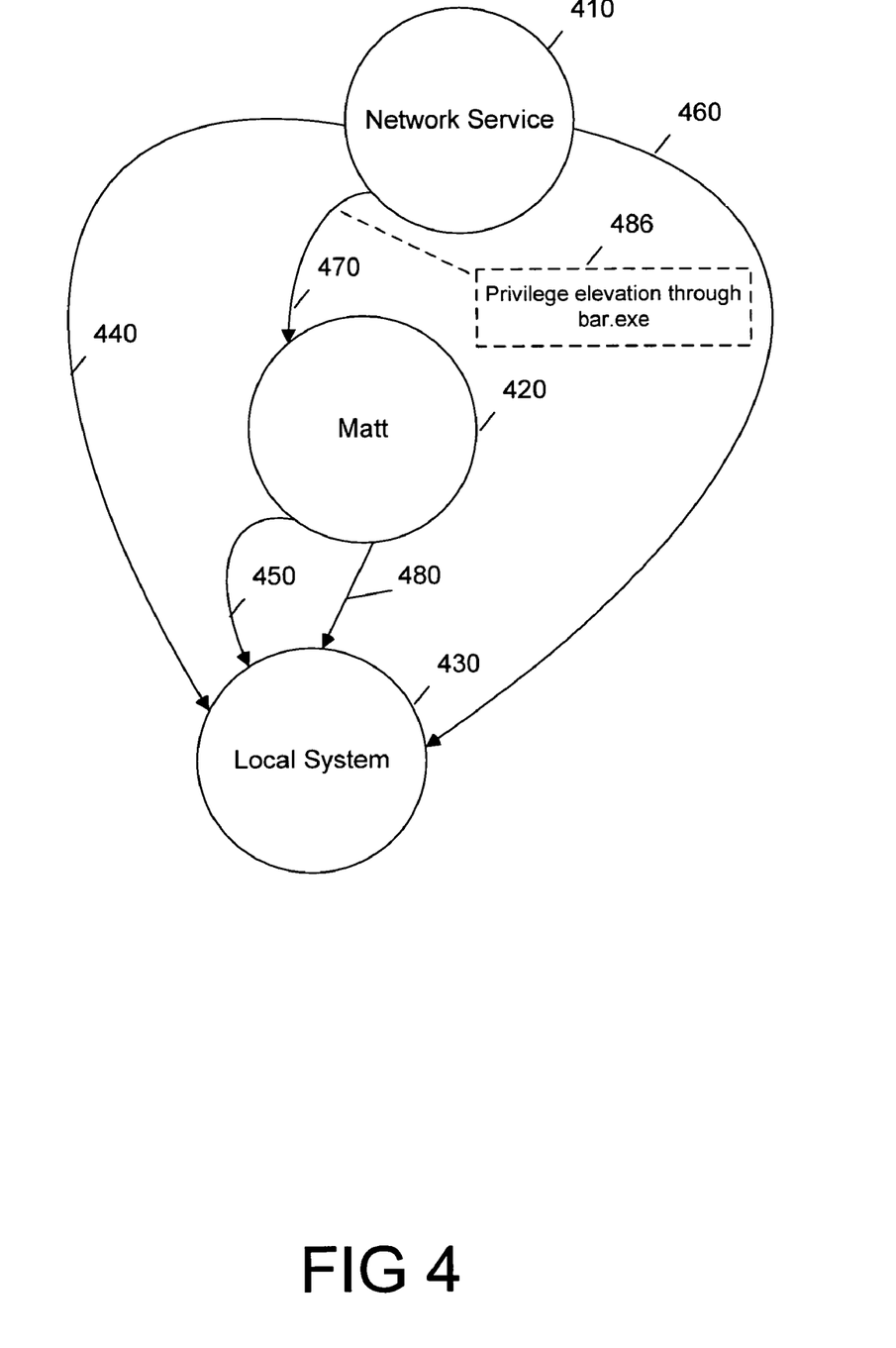
FIG. 4 is a graph from an exemplary privilege elevation graph generation system in accordance with the invention.

For example, FIG. 4 illustrates an exemplary graph generated from the detected privilege elevation flaws for a particular host system. The graph shows the various privilege elevations that may allow a user to get to Local System. These are represented by edges 450, 460, 470, and 480. In this example, the user is presented with a subset of the privilege elevations from the accounts Network Service 410 and Matt 420, to Local System 430. The user may then click on, or otherwise select, one of the edges to view the details of the underlying privilege elevation. For example, a user has selected one of the edges between Network Service 410 and Matt 420. Accordingly, a text box 486 is displayed indicating the that elevation is through a process called bar.exe. Any system, method or technique known in the art for displaying selected data may be used.

As shown, several edges, or privilege elevations are illustrated between each node. However, the user may wish to simplify the displayed graph by showing only a single edge between each node. The user may be able to view the various underlying privilege elevations by clicking on, or otherwise selecting the particular edge, for example. Any system, method, or technique known in the art may be used.

At 330, the user may refine how the graph is displayed. For example, the user may desire to revise the nodes selected to view and add or remove nodes from the graph. When the user adds or removes nodes, the corresponding privilege elevations, or edges, are desirably added or removed from the graph. The user may select desired nodes from a menu, for example. Any system, method, or technique known in the art for selecting nodes to display on a graph may be used.

In addition, the user may be able to select the particular privilege elevations displayed on the graph. For example, certain privilege elevations may be considered more serious than others, or the user may be interested in a specific type of privilege elevation. Similar to the nodes described above, the user may select the particular types or categories of privilege elevations displayed on the graph. In addition, the privilege elevations may be categorized according to the types of privilege elevations, or the perceived seriousness of the elevations, for example.

Figure 5:
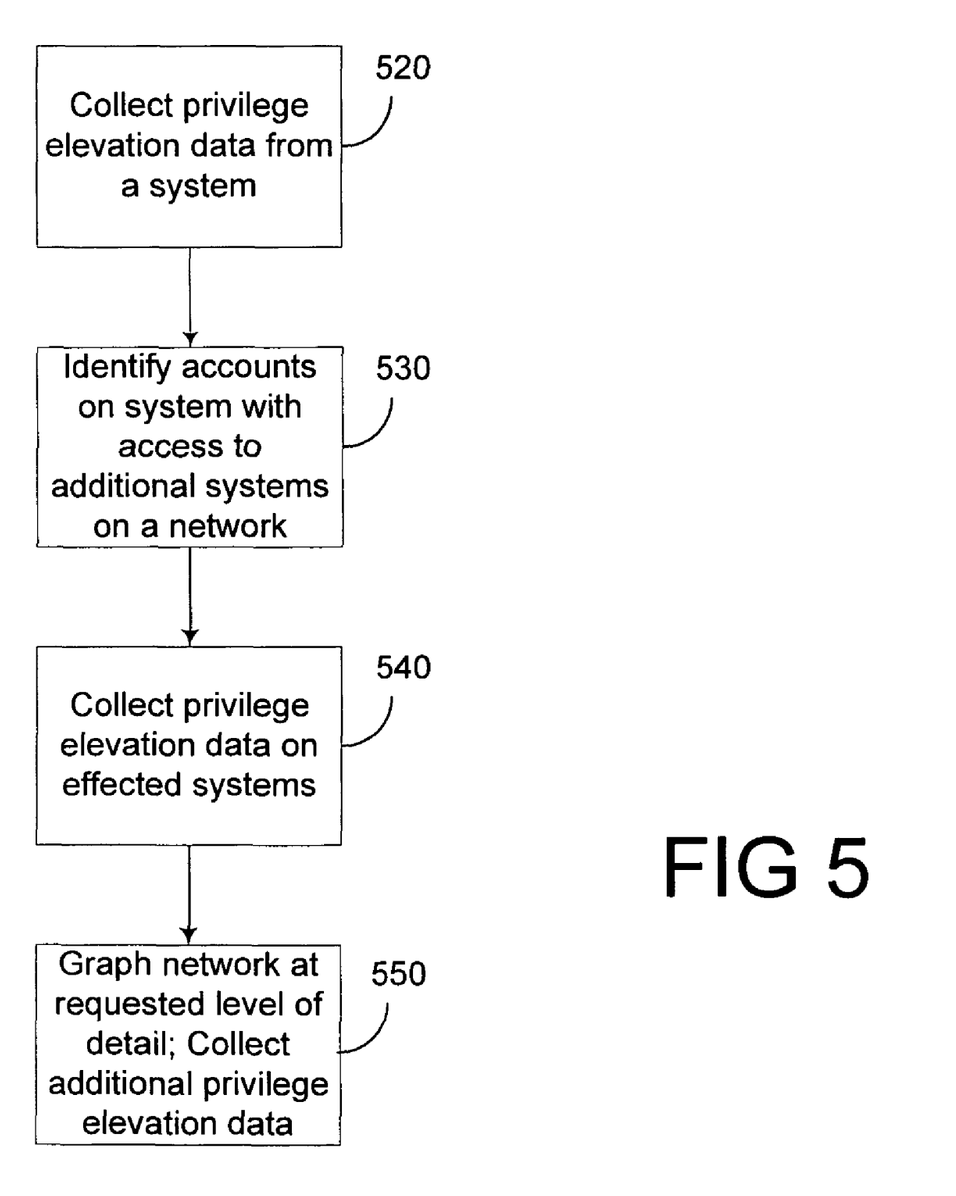
FIG. 5 is a flow diagram illustrating an exemplary method for privilege elevation graph generation in accordance with the invention.

FIG. 5 is a diagram illustrating an exemplary method for generating a network privilege elevation graph. A privilege elevation flaw detection analysis is performed on a host system on a network. In addition, accounts on the host system are identified that have access to, or corresponding accounts on, other systems on the network. Privilege elevation analyses are performed on one or more of the network systems corresponding to the identified accounts. A privilege elevation graph of the host system is generated from the privilege elevation analysis. The graph includes account nodes and edges illustrating the detected privilege elevations between the accounts on the host system. In addition, nodes for the network systems are added to the graph along with edges connecting to the nodes corresponding to the accounts identified as having access to the particular network systems. The user may then select a particular network system node and view its corresponding privilege elevations.

At 520, a privilege elevation analysis is desirably performed on a host computer. The privilege elevation analysis may be conducted using the method as described with respect to FIG. 1, for example.

At 530, accounts on the host system that have access to other systems on the network are identified. For example, a user account Matt may have an associated account, or rights on other computers on the network. These accounts can be conceptually thought of as privilege elevations from the Matt account to the particular computers on the network because a malicious user who gains access to the account Matt on the host system may have access to the corresponding accounts on the other systems on the network. Thus, the malicious user may potentially gain access to other systems on the network through privilege elevations on the computer. Any system, method or technique known in the art for identifying local accounts with access to computers on the network may be used.

At 540, a privilege elevation analysis may be performed on all or some of the systems that were identified as potentially accessible from the Local System. The privilege elevation analysis may be similar to the analysis as performed at 520. The analysis may be performed remotely from the host system, or at the systems themselves, for example.

At 550, a privilege elevation graph may be generated. The privilege elevation graph may be generated using the method described with respect to FIG. 3, for example. To facilitate the addition of the network systems to the graph, an edge may be added to the graph from accounts that have access to other systems to the corresponding account at the other systems. For example, if a user account Matt on Computer A has access to a corresponding user account Matt on other systems, then an edge may be generated on the graph connecting the relevant systems through the user account Matt.

Because the privilege elevation graph may span several systems, the user may initially be presented a graph comprising nodes for the relevant systems in the network, connected by edges representing the linking accounts. Where there are multiple edges connecting systems, the user may choose to view each separate edge, or a single edge between each system.

Figure 6:
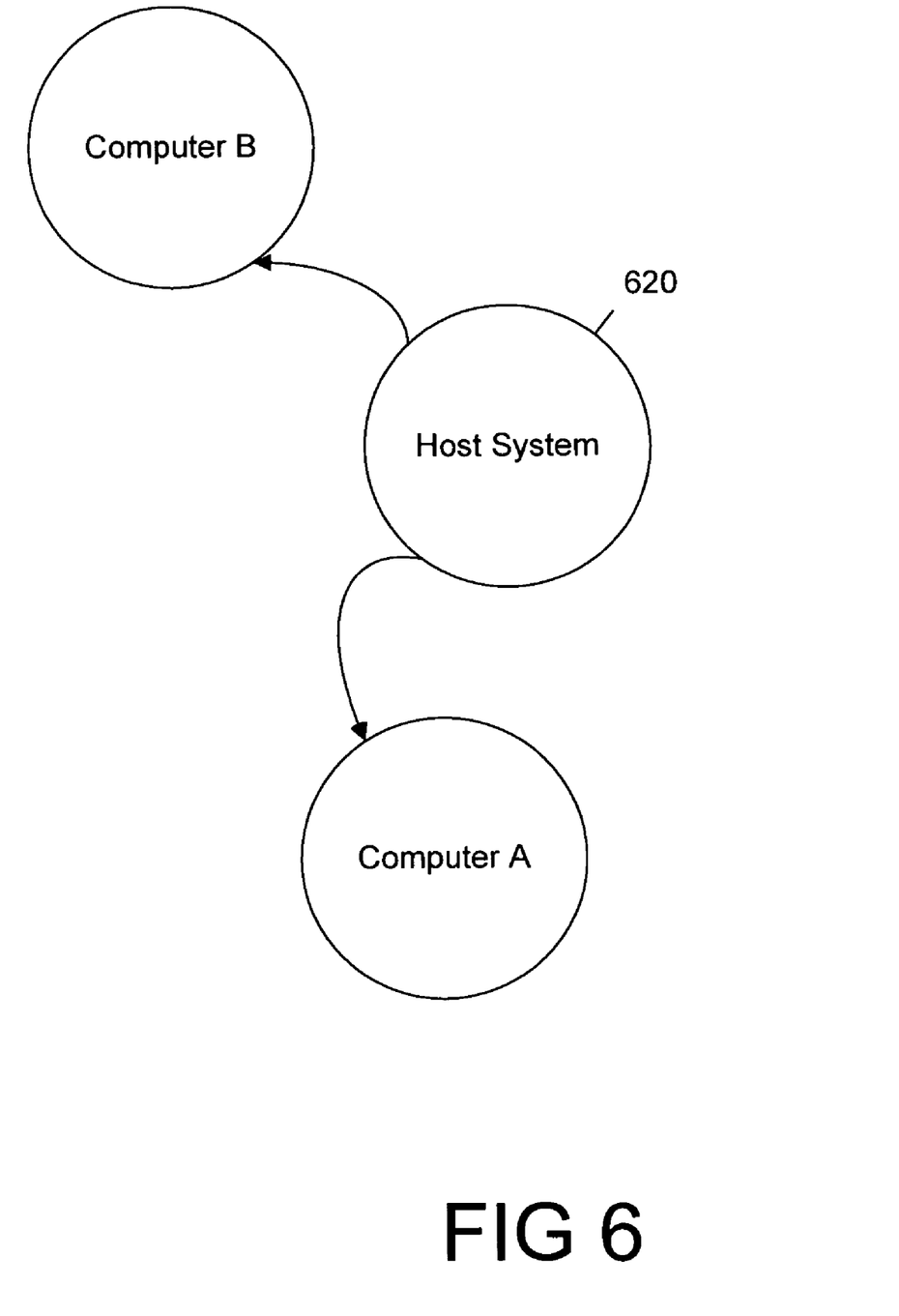
FIG. 6 is a graph generated by an exemplary privilege elevation graph generation system in accordance with the invention.

For example, FIG. 6 illustrates an exemplary screenshot of such a network privilege elevation graph. As described above, the graph may be initially displayed with only the edges connecting the host system to the various computers on the network. As shown, the host system 620 is connected though one or more accounts (not shown) to computers A and B. While only three computers are shown, it is not meant to limit the invention to only four computers, there is no limit to the number of computers that may be supported.

The user may wish to further refine the displayed graph to display the detected privilege elevations. The user may click, or otherwise select, a computer from the graph to display the detected privilege elevations for that system, if any.

Figure 7:
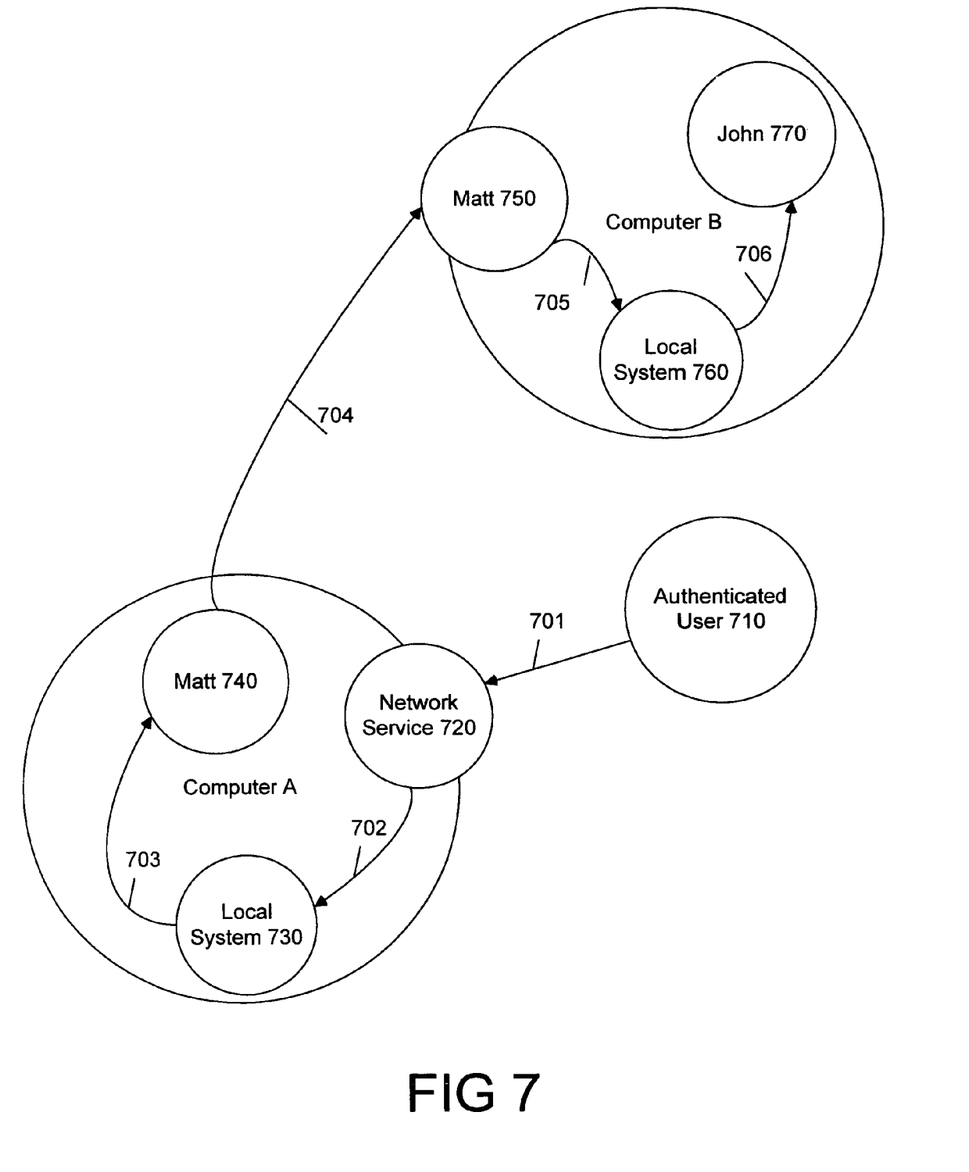
FIG. 7 is a graph generated by an exemplary privilege elevation graph generation system in accordance with the invention.

For example, as illustrated in FIG. 7, the user may have selected to view the privilege elevations of the host system 620 in greater detail. As shown, the host system node 620 from FIG. 6 has been replaced with all or some of the privilege elevations and accounts in the host system 620 and accounts on computers A and B. For example, host system 620 has been replaced with the node authenticated user 710. Node 710 is connected through the privileged elevation 710 to the network service node 720 on computer A. Computer A is connected to computer B through the account node matt 740, privilege elevation 704, and the account node matt 750. While not illustrated in FIG. 7, the account nodes may be displayed using a different size, color, or shape than the computer nodes to help differentiate them.

EXEMPLARY COMPUTING ENVIRONMENT

Figure 8:
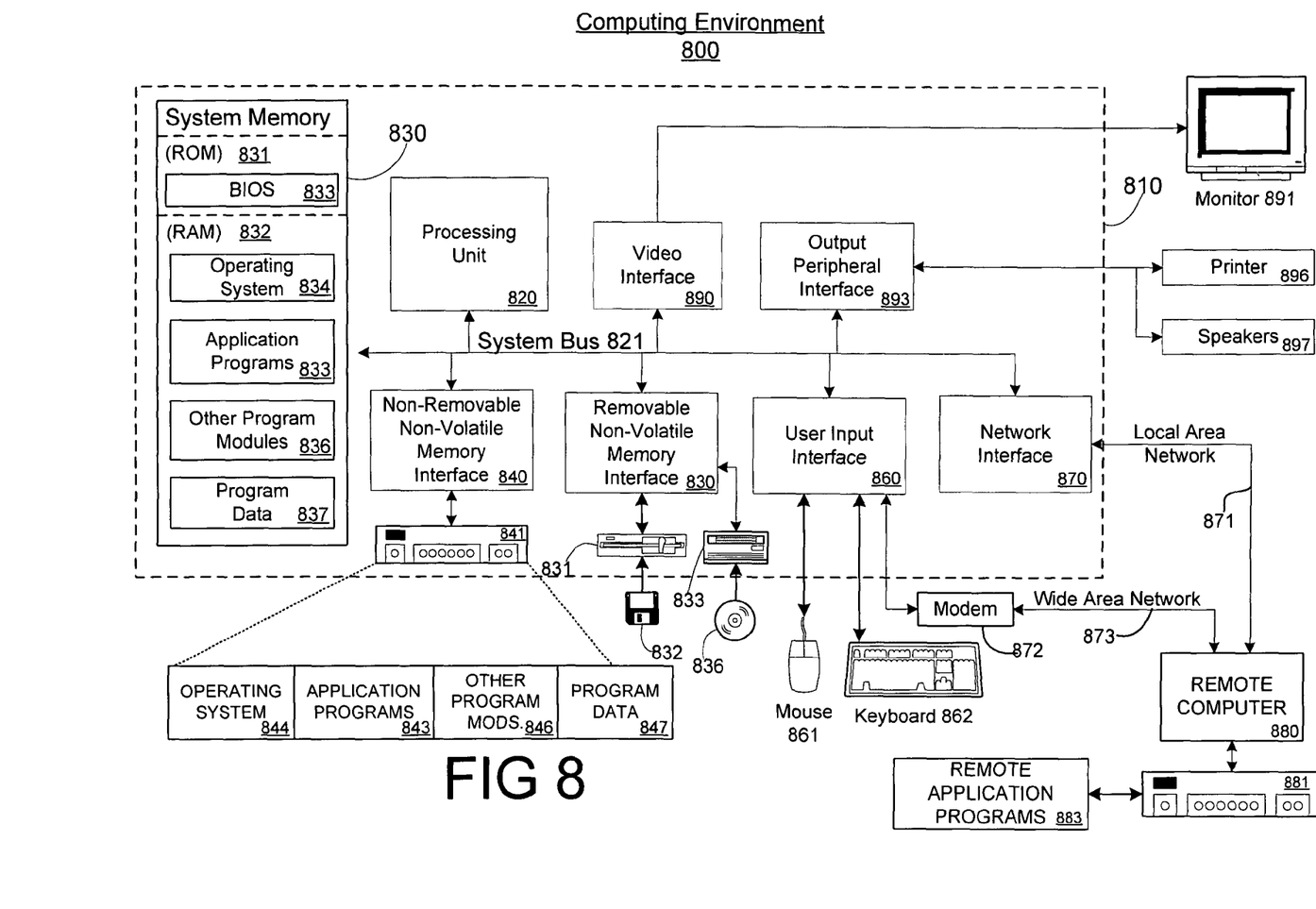
FIG. 8 is a block diagram showing an exemplary computing environment in which aspects of the invention may be implemented.

FIG. 8 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820.

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/non-volatile computer storage media. By way of example only, FIG. 8 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted include a LAN 871 and a WAN 873, but may also include other networks. Such networking environments are commonplace in offices, enterprise-wide computer networks, intranets and the internet.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method of generating a privilege elevation graph, the method comprising:
   performing a privilege elevation analysis on a computer system having a plurality of associated security identifiers, each security identifier corresponding to an object that potentially accesses another object and gains elevated privileges on the computer system, the performing of the privilege elevation analysis on the computer system including detecting privilege elevations between security identifier pairs; and
   generating a graph illustrating the results of the privilege elevation analysis, the generating of the graph comprising:
      generating a node for each of the security identifiers; and
      for each detected privilege elevation between security identifier pairs, generating at least one edge directly between the nodes corresponding to the security identifier pairs, the edges including a first edge and a second edge directly leading from a first node to a second node of a first security identifier pair; and
   displaying the generated graph, the displaying comprising:
      displaying the first and the second edges as two separate edges between the first node and the second node; and
      providing an option to combine the first and the second edges into a single edge directly leading from the first node to the second node, and further providing an ability to view underlying privilege elevations.

2. The method of claim 1, further comprising:
   selecting a subset of the nodes as goal nodes;
   determining nodes that are connected to the goal nodes through one or more edges; and
   highlighting the edges connecting the nodes that are connected to the goal nodes through one or more edges.

3. The method of claim 1, wherein the privilege elevations have an associated privilege elevation category, and only generating an edge between security identifier pairs for privilege elevations belonging to a selected category.

4. The method of claim 1, further comprising:
   for each detected privilege elevation between security identifier pairs, generating a third edge from the second node to a third node, and a fourth edge from the first node to the third node, the fourth edge bypassing the second node,
   the detecting of privilege elevations between security identifier pairs including detecting a plurality of privilege elevations from a first one of a particular security identifier pair directly to a second one of the particular security identifier pair, each detected privilege elevation from the first one directly to the second one of the particular security identifier pair representing a distinct and differing avenue of gaining elevated privilege from the first one directly to the second one of the particular security identifier pair, the generating of the edge between the nodes corresponding to the particular security identifier pair including generating an edge for each of the plurality of privilege elevations between the nodes corresponding to the particular security identifier pairs, the edges for all of the plurality of detected privilege elevations between the first and second ones of the particular security identifier pair representing all of the distinct and differing avenues of gaining elevated privilege from the first one directly to the second one of the particular security identifier pair, and departing from the node corresponding to the first one of the particular security identifier pair and arriving at the node corresponding to the second one of the particular security identifier pair, receiving an input identifying one of the edges between the first and second ones of the particular security identifier pair; and displaying a description of the privilege elevation corresponding to the identified edge in response to the received input, the displayed description residing in a text box adjacent the identified edge.

5. The method of claim 1, wherein the each of the first and the second edges are uni-directional edges leading from the first node to the second node.

6. The method of claim 1, wherein viewing underlying privilege elevations comprises displaying in response to a user input, a text box containing a description of a privilege elevation.

7. The method of claim 6, wherein the description includes an identity of a process associated with the privilege elevation.

8. A system for generating a privilege elevation graph, comprising:
a processor with a storage coupled thereto, the storage having a plurality of associated security identifiers, each security identifier corresponding to an object that potentially accesses another object and gains elevated privileges, the processor adapted to:
perform a privilege elevation analysis including detecting privilege elevations between security identifier pairs; and
generate a graph illustrating the results of the privilege elevation analysis by:
generating a node for each of the security identifiers; and
for each detected privilege elevation between security identifier pairs, generating at least one edge directly between the nodes corresponding to the security identifier pairs, the edges including a first edge and a second edge directly leading from a first node to a second node of a first security identifier pair; and
a display adapted to display the generated graph, the displaying comprising:
displaying the first and the second edges as two separate edges between the first node and the second node; and
providing an option to combine the first and the second edges into a single edge directly leading from the first node to the second node, and further providing an ability to view underlying privilege elevations.

9. The system of claim 8, wherein the processor is further adapted to:
select a subset of the security identifiers;
generate a node for each of the security identifiers in the subset of security identifiers; and
for each detected privilege elevation between security identifier pairs, generate an edge between the nodes corresponding to the security identifier pairs.

10. The system of claim 8, wherein each of the first and the second edges are uni-directional edges leading from the first node to the second node.

11. The system of claim 8, wherein the processor is further adapted to:
select a subset of the nodes as goal nodes; and
identify nodes that are connected to the goal nodes through one or more generated edges.

12. The system of claim 9, wherein the privilege elevations have an associated privilege elevation category, and the processor is further adapted to only generate an edge between security identifiers pairs for privilege elevations belonging to a selected category.

13. The system of claim 11, wherein the display is further adapted to highlight the generated edges connecting the identified nodes that are connected to the goal nodes through one or more generated edges.

14. The system of claim 13, wherein the display is further adapted to display a description of the associated privilege elevation next to one or more highlighted generated edges.

15. A hardware machine readable storage medium with computer-executable instructions stored thereon for performing a method comprising:
performing a privilege elevation analysis on a computer system having a plurality of associated security identifiers, each security identifier corresponding to an object that potentially accesses another object and gains elevated privileges on the computer system, the performing of the privilege elevation analysis on the computer system including detecting privilege elevations between security identifier pairs; and
generating a graph illustrating the results of the privilege elevation analysis, the generating of the graph comprising:
generating a node for each of the security identifiers; and
for each detected privilege elevation between security identifier pairs, generating at least one edge directly between the nodes corresponding to the security identifier pairs, the edges including a first edge and a second edge directly leading from a first node to a second node of a first security identifier pair; and
displaying the generated graph, the displaying comprising:
displaying the first and the second edges as two separate edges between the first node and the second node; and
providing an option to combine the first and the second edges into a single edge directly leading from the first node to the second node, and further providing an ability to view underlying privilege elevations.

16. The machine readable storage medium of claim 15, wherein generating the graph comprises computer-executable instructions for:
selecting a subset of the security identifiers;
generating a node for each of the security identifiers in the subset of security identifiers; and
for each detected privilege elevation between security identifier pairs, generating an edge between the nodes corresponding to the security identifier pairs.

17. The machine readable storage medium of claim 16, wherein the privilege elevations have an associated privilege elevation category, and further comprising computer-executable instructions for only generating an edge between security identifier pairs for privilege elevations belonging to a selected category.

18. The computer-readable storage medium of claim 15, wherein each of the first and the second edges are uni-directional edges leading from the first node to the second node.

* * * * *